UNITED STATES PATENT OFFICE.

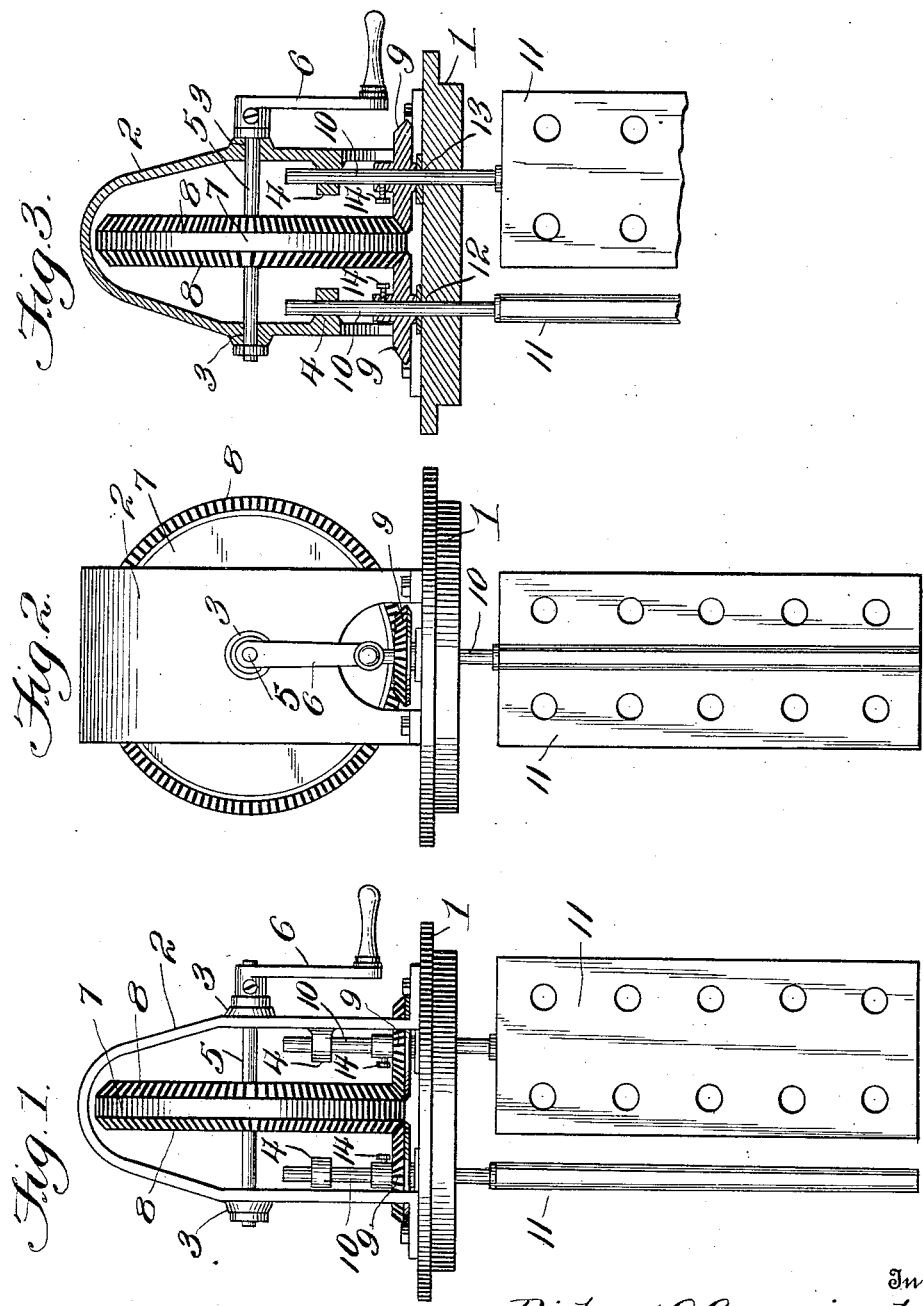
R. A. CUNNINGHAM.
CHURN OPERATING MECHANISM.
APPLICATION FILED OCT. 4, 1911.
1,049,056.
Patented Dec. 31, 1912.
Inventor
Richard A. Cunningham
By Victor J. Evans,
Attorney
Witnesses

RICHARD A. CUNNINGHAM, OF SPANISH FORT, TEXAS.

CHURN-OPERATING MECHANISM.

1,049,056.

Specification of Letters Patent. Patented Dec. 31, 1912.

Application filed October 4, 1911. Serial No. 652,785.

*To all whom it may concern:*

Be it known that I, RICHARD A. CUNNINGHAM, a citizen of the United States, residing at Spanish Fort, in the county of Montague and State of Texas, have invented new and useful Improvements in Churn-Operating Mechanism, of which the following is a specification.

This invention relates to churn operating mechanism, the object of the invention being to provide a dasher operating mechanism which is simple, inexpensive, rapid and efficient in operation, capable of being applied for use upon any ordinary churn body, and adapted to be easily and conveniently cleaned.

The invention consists of the features of construction, combination and arrangement of parts, hereinafter fully described and claimed, reference being had to the accompanying drawing, in which:—

Figure 1 is a front elevation of a churn operating mechanism embodying my invention. Fig. 2 is a side elevation of the same. Fig. 3 is a vertical transverse section through the operating mechanism.

Referring to the drawing, 1 designates the base of the operating mechanism, which may form the lid or cover of the churn, so that the operating mechanism may be mounted upon a churn body of determined size and conventional form. Supported by this base or lid is an arched frame 2, which is suitably secured to said base or lid, and has its side walls provided with bearings 3 and inwardly extending bracket members 4.

Journaled in the bearings 3 is a horizontal transverse shaft 5 provided with an operating crank or handle 6. This shaft carries a double cog wheel 7 provided with cog teeth 8 on its opposite faces, which mesh with pinions 9 on the upwardly extending stems 10 of a pair of perforated dashers 11.

The dashers 11 are normally arranged at right angles to each other and rotate in opposite directions, so that they will just clear each other in their paths of movement, to secure a rapid and effective churning of the cream. The said stems 10 of the dashers are journaled, respectively, in bearing openings 12 and 13 in the base 1 and brackets 4, through which bearing openings the stems are also adapted to slide to admit of the adjustment of the dashers to any desired elevation in the churn body. The cog wheels or pinions 9 are secured to the stems 10 by set screws or other suitable fastenings 14, enabling them to be detached and the dashers removed, for convenience in cleaning them after each churning operation. This construction also permits the stems to be adjusted upwardly through the pinions to position the dashers at the desired elevation.

In operation, the shaft 5 is rotated by means of the crank or handle 6, whereby motion is imparted to the cog wheels 7, which in turn simultaneously transmit motion to the pinions 9 to revolve the dashers in opposite directions. By this construction the dashers may be rapidly revolved to churn the cream within a minimum amount of time without agitating the cream vertically and causing it to slop out of the churn body and become wasted. After the churning operation is completed, the set screws 14 are loosened to enable the dashers to be withdrawn, whereupon they may be readily cleaned. As the operating mechanism constructed as described may be employed upon any ordinary churn, its convenience and efficiency in use will be appreciated.

Having thus described the invention, what I claim as new is:

An operating mechanism of the character described, comprising gearing mechanism of the character described, a wide side plate with parallel edges and having a semi-circular opening in the lower portion of said plate, a stem-bearing lug extended from the inner surface of said plate immediately above said opening, and an axle bearing lug extended from the outer surface of said plate directly over and in the line of the first mentioned lug and opening; and an arch member extending over, partly covering, and incasing or protecting said gearing mechanism, and connecting the said side plate to a like side plate; said operating gear mechanism disposed in, between, and under said arch member and said side plates, substantially as specified.

In testimony whereof I affix my signature in presence of two witnesses.

RICHARD A. CUNNINGHAM.

Witnesses:
W. A. PAINTER,
J. W. LEE.

Copies of this patent may be obtained for five cents each, by addressing the "Commissioner of Patents, Washington, D. C."